May 1, 1962   A. D. CHIPMAN ET AL   3,032,460
ADHESION OF POLYVINYL CHLORIDE
Filed July 23, 1958
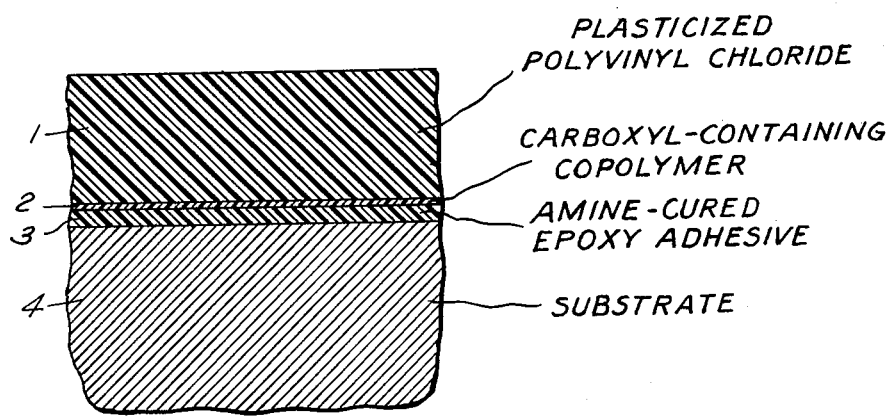
INVENTORS
*Arthur D. Chipman*
*Malcolm Seymour*
BY
ATTORNEYS

United States Patent Office 3,032,460
Patented May 1, 1962

3,032,460
ADHESION OF POLYVINYL CHLORIDE
Arthur D. Chipman, Reading, and Malcolm Seymour, North Andover, Mass., assignors to The General Tire & Rubber Company, Akron, Ohio, a corporation of Ohio
Filed July 23, 1958, Ser. No. 750,505
15 Claims. (Cl. 154—45.9)

The present invention relates to the adhesion of vinyl halide polymers or the like and more particularly to a laminated article and a method of making the same wherein plastic bodies of polyvinyl chloride or the like are bonded to themselves or to other substrate surfaces using thermosetting and self-hardening amine-epoxy adhesives which may easily be applied while in the tacky and fluid condition.

Heretofore many different methods have been employed in an attempt to obtain satisfactory adhesion between a polyvinyl chloride plastic body and a substrate surface. According to one method, an adhesion dissolved in a suitable solvent is applied to the plastic body and/or to the substrate surface and the bodies are joined after almost all of the solvent has evaporated. The adhesive may be reactivated after the solvent has evaporated by the use of more solvent before joining the bodies. The above method has the disadvantages that the solvents tend to blister, soften or otherwise degrade the plastic and that the diffusion of the solvent through the plastic is too slow to permit rapid development of a strong bond.

Better results are obtained where the solvent is completely evaporated and the adhesive layer is reactivated by heat when joining the plastic body to the substrate surface, and most commercial laminating of polyvinyl chloride plastics is by this heat reactivation method. However, the latter method requires a substantial amount of equipment and the utmost in skill to obtain satisfactory drying, to heat the material sufficiently to obtain proper adhesive affinity, and to maintain the pressure needed to maintain an intimate contact between the plastic body and the substrate surface. Slight variations in temperatures can cause blisters in the adhesive layer, curing or degradation of the adhesive layer, poor bonds, charring or deterioration of the plastic, or undesirable deformation of the plastic body or the embossed designs therein. The use of polyvinyl chloride plastics has been severely limited because of the deficiency in the above methods.

Prior to the present invention, conventional liquid epoxy resin adhesive compositions have been commercially unsatisfactory for use with polyvinyl chloride plastics because of their inability to adhere strongly to those particular materials. A satisfactory bonding of a plasticized polyvinyl chloride layer, for example, by means of epoxy resins compounded with the usual fillers, extenders, diluents, curing agents and/or catalysts is not obtained even when employing a barrier layer between the polyvinyl chloride and the epoxy adhesive composition to prevent migration of the monomeric and/or polymeric plasticizer to the adhesive layer. Apparently it was for these reasons that the use of liquid epoxy type adhesive compositions prior to this invention was, as a practical matter, limited to non-plastic materials such as wood, masonry, metal or the like and a few plastics, such as styrene, nitrocellulose, cellulose acetate, ethyl cellulose, polyester resins, phenolic resins, or epoxy resins. Thus, before the present invention, epoxy-resin-based adhesive systems have never been widely accepted or utilized in the art for bonding plasticized or rigid unplasticized polyvinyl chloride.

We have found that good adhesion of plasticized polyvinyl chloride by liquid epoxy resin adhesive compositions is not obtained merely by using ordinary barrier layers to prevent migration of the plasticizer and have discovered that, for some reason which is not fully understood, good adhesion can be obtained if a special method is employed which utilizes a particular type of tie coat or bonding layer in conjunction with certain epoxy resins and certain types of primary and secondary amine curing agents having active amine hydrogen atoms. We have discovered that certain amine-cured polyepoxide resins will adhere to resinous long-chain thermoplastic copolymers having acidic oxycarboxide (carboxyl or anhydride) groups, even though previous tests indicated they would not adhere to similar copolymers which were free of carboxyl and anhydride groups, and that some carboxyl-containing copolymers will adhere to calendered sheets of plasticized polyvinyl chloride or the like.

We found that inferior articles were produced using the carboxyl-containing tie coats described above on the polyvinyl chloride sheet when employing conventional curing agents, solvents and dispersing vehicles and conventional epoxy resins which materials were of a chemical nature to produce a change in the physical characteristics of the polyvinyl chloride sheet, especially when high temperatures were required. We discovered that the use of undesirable ingredients and high temperatures could be avoided and that high quality articles could be obtained using certain epoxy resins and amine curing agents of relatively low melting point which could be mixed to provide the necessary fluidity for application of the adhesive at room temperature without the necessity for strong solvents which damage the polyvinyl chloride sheets or high temperatures which also damage said sheets. This discovery led to the further discovery that liquid epoxy resin or liquid resin blends and certain liquid amine curing agents could be mixed to provide practical effective low cost liquid adhesives containing large amounts of inexpensive fillers which materially increase the viscosity and that the necessary fluidity for spreading of the adhesive at room temperature could be obtained with small amounts of diluents or solvents, such as alcohols or other solvents which have no substantial solvent action on the polyvinyl chloride sheet. The present invention is not merely of academic interest but is extremely important commercially because of its unusual practical advantages.

When a sheet of polyvinyl chloride is joined to a substrate by the method of the present invention, the strength of the bond is extremely high and often exceeds the strength of the sheet itself. The reason for this is difficult to understand. The fact that the rate of buildup of bonding strength is generally proportional to the rate of curing or hardening of the epoxy resin and the further fact that adhesion improves upon further curing of the epoxy resin with age would seem to indicate that a chemical reaction accounts for the extremely high bond strengths or that there is a molecular interfacial relationship between the molecules of the intermediate bonding layer and the molecules of the cured epoxy adhesive.

The method of the present invention comprises applying to a plastic sheet or body, formed from vinyl halide polymers and usually containing monomeric and/or polymeric plasticizers, an intermediate tie coat or bonding layer formed from copolymers having excellent adhesion to the plastic body and containing ordinary carboxyl or dehydrated carboxyl (anhydride) groups. The carboxyl-containing copolymers of the bonding layer are preferably derived principally from vinyl halides, especially halides similar to those from which the polymers forming the plastic body are principally derived, but good adhesion may also be obtained where the carboxyl-containing copolymers of the bonding layer are derived principally from certain acrylic esters.

The tie coat or bonding layer may then be adhered to a substrate by applying a curable adhesive mixture of epoxy resinous material and primary and/or secondary amine curing agents which is fluid at or about room temperature. The adhesive mixture may contain (1) diglycidyl ethers of bisphenol A or higher homologues, glycidyl ethers of glycerol, glycidyl ethers of bisphenol F, diglycidyl ethers of trihydroxyl diphenyl dimethyl methane, epoxylated novolacs as described for example in British specification, No. 746,824 of 1956, glycidyl ethers of long-chain bisphenol as described in U.S. Patent No. 2,665,266, mixtures of the above, or other epoxy resins and (2) primary and/or secondary polyamine curing agents having active amine hydrogen atoms such as aliphatic amines, aliphatic amine-glycidyl adducts, aliphatic amine-alkylene-oxide adducts, aliphatic amine-resin adducts, cyanoethylation products of aliphatic amines, polymeric polyamide reaction products of fatty acids and aliphatic polyamines, mixtures of the above or the like. The epoxy resins and the polyamine curing agents preferably have melting points not in excess of about 50° C. and provide an adhesive layer which may be cured in a reasonable time at a temperature of 15° to 50° C.

The present discovery facilitates bonding of polyvinyl chloride and similar vinyl halide materials to almost any type of surface and represents a giant stride forward in the art because it opens up so many new fields for the use of polyvinyl chloride.

An object of the invention is to provide a simple inexpensive method of bonding a vinyl-chloride-containing plastic body to itself or to other substrate surfaces which provides durable high strength bonds that do not deteriorate substantially due to ageing.

Another object of the invention is to provide an effective method of bonding sheets of polyvinyl chloride plastics to walls and other substrates which does not require special equipment and which may be performed without the application of heat.

A still further object of the invention is to provide a satisfactory method of bonding sheets of polyvinyl halide plastics to glass, metal and other substrate surfaces using liquid epoxy resin adhesives.

Another object of the invention is to provide a method of bonding polyvinyl halide sheets to substrates by means of epoxy adhesives which may be compounded to provide the desired fluidity at room temperature without requiring undesirable types and undesirable amounts of solvents or dispersing vehicles which could damage said sheets or seriously reduce the bond strengths.

Other objects, uses and advantages of the invention will become apparent to those skilled in the art from the following description and claims and from the drawing in which the FIGURE illustrates schematically a typical laminated article made by the method of the present invention.

The article shown in the drawing comprises a plastic body or layer 1 of plasticized polyvinyl chloride, a thin intermediate bonding layer 2 of resinous copolymers that adhere strongly to the plastic body 1, a relatively thin layer or film 3 of a cured epoxide resin adhesive, and a substrate 4 of metal, glass, wood or other suitable material. The adhesive layer 3 is firmly bonded both to the substrate 4 and to the bonding layer 2 whereby the plastic body is firmly attached to the substrate.

The present invention is concerned with the bonding of thermoplastic vinyl resins wherein the major portion (and preferably at least about three-fourths) of the groups of the molecules of said resins consist only of carbon, hydrogen and halogen and are formed from mono-olefinic compounds preferably of the general Formula I

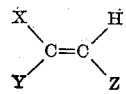

having one or two halogen groups, where C is carbon, H is hydrogen, X is a halogen, such as fluorine, chlorine or bromine (preferably chlorine), Y is selected from the group consisting of methyl, hydrogen, and halogen (including chlorine, bromine and iodine) radicals and preferably from the group consisting of hydrogen and chlorine radicals, and Z is selected from the group consisting of hydrogen and methyl radicals.

Examples of such mono-olefinic compounds defined by said general Formula I are vinyl halide compounds such as vinyl chloride, vinylidene chloride or vinyl bromide. These monomeric materials, either alone or in admixture with one or more other compounds, may be polymerized to the solid or resinous state either en masse or by any of the various known emulsion, solution or suspension polymerization techniques as desired.

The thermoplastic resins in the base layer 1 consist principally of polymers, including homopolymers, terpolymers and other copolymers of the above mono-olefinic compounds defined for example, by the general Formula I and may consist entirely of such polymers or may include minor amounts of other resins in admixture with said polymers. Said polymers include copolymers and hydrolyzed copolymers of a major portion of the above-mentioned mono-olefinic compounds under the general Formula I and a minor portion of copolymerizable mono-olefinic compounds (usually liquids) preferably of the general Formula II

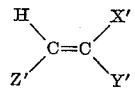

where X' is a member of the group consisting of hydrogen and alkyl groups (preferably methyl and ethyl groups), Y' is a member of the group consisting of nitrile, carboxyl and ester groups (such as

or

where R is an alkyl group, such as methyl, ethyl, propyl or the like), and Z' is a member of the group consisting of hydrogen, ester (as above), methyl, ethyl, and halogen (including chlorine and bromine) groups. The copolymers may be hydrolyzed so as to have a minor portion of hydroxyl groups (of the type found in polyvinyl alcohol) which can be reacted with aldehydes, such as formaldehyde, acetaldehyde, propionaldehyde, butyraldehyde, or the like to form polyvinyl acetal groups.

The invention is particularly concerned with the bonding of homopolymers of vinyl chloride, copolymers of a major portion of vinyl chloride and a minor portion of vinylidene chloride, copolymers of a major portion of vinyl chloride and a minor portion of vinyl acetate, mixtures of the above, and similar vinyl resins. The resins may, for example, be copolymers of 85 to 95% vinyl chloride and up to 15% of compounds such as vinyl acetate or diethyl maleate, or may be a vinyl-acetal such as vinyl butyral chloride in which the vinyl chloride component of the resinous copolymer is 85 to 95%.

Examples of the above-mentioned copolymerizable mono-olefinic compounds are derivatives of alpha-beta and beta-gamma olefinic unsaturated carboxylic acids including esters of maleic and fumaric acids, such as dimethyl maleate, diethyl maleate, dimethyl fumarate or diethyl fumarate; nitriles, esters and similar derivatives of acrylic acid including acrylonitrile, methyl acrylate, ethyl acrylate, n-propyl acrylate, isopropyl acrylate and other alkyl acrylates; nitriles, esters and similar derivatives of alpha-methyl acrylic acid, including methyl acryonitrile, methyl methacrylate, ethyl methacrylate, n-propyl methacrylate, isopropyl methacrylate and other alkyl methacrylates; nitriles, esters and similar derivatives of vinyl-acetic acid, butenoic acids, pentenoic acids, other beta-gamma unsaturated acids, or the like; vinyl and halogenated vinyl esters, such as vinyl acetate, vinyl butyrate, vinyl propionate, vinyl formate, chlorovinyl acetate, bromovinyl acetate or the like; and other unsaturated compounds having carbonyl groups including vinyl esters, vinyl ethers and similar compounds.

The plastic layer 1 may, therefore, consist of suitable monomeric and/or polymeric plasticizers and vinyl halide resins or resin mixtures. The vinyl resins may consist only of polymers (including homopolymers, terpolymers and other copolymers) of vinyl halide compounds or may consist of a mixture of such polymers with polymers of said copolymerizable mono-olefinic compounds such as those included under the above general Formula II. However, the amount of cross-linking should be minimized for flexible articles, and it is preferable to employ thermoplastic vinyl resins only.

At least about three-fourths of the depending groups, other than alkyl and hydrogen groups, attached to the long carbon chains of the thermoplastic resins (or resin mixtures) forming the layer 1 are halogen groups derived from vinyl chloride or other vinyl halide compounds of the above general Formula I, and up to one-fourth of said depending groups of said resins may be nitrile, oxygen-containing, or carbonyl-containing groups or other groups, such as a member of the group consisting of nitrile, ester and hydroxyl groups which may, for example, be derived from mono-olefinic compounds of the above general Formula II.

The invention is particularly concerned with homopolymers of vinyl chloride, but good results may be obtained where 85 to 95 percent of the groups of the thermoplastic resins of the plastic layer 1 are formed from vinyl chloride and 5 to 15 percent of said groups are formed from vinyl acetate.

Other polymers of vinyl halide compounds well suited for the layer 1 include other copolymers of vinyl chloride and vinyl acetate, copolymers of vinyl chloride and vinylidene chloride, polyvinylidene chloride, and polymers having vinyl acetal groups, such as polyvinyl butyral or the like.

It is to be understood that the term "polymer," as used in the specification and the appended claims, is used in the generic sense and includes copolymers (including terpolymers), homopolymers, or the like. The term "copolymer" is also used in the generic sense and includes polymers of two, three or more copolymerizable mono-olefinic compounds. The term "carboxyl" is used in the claims hereof in the narrow sense to cover the —COOH groups and to exclude dehydrated carboxyl (anhydride) groups. Wherever used herein the term "acidic oxycarboxide" means the oxycarbonyl

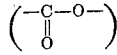

radical of an ordinary carboxyl or dehydrated carboxyl group and excludes ester or ether radicals or any other non-acid groups.

Substantial amounts of plasticizer may be used to obtain highly flexible extensible thermoplastic articles. It is often desirable to employ a mixture of polymeric and monomeric plasticizers to obtain a high quality flexible product. The monomeric plasticizers have a tendency to migrate but are often desirable because of their effectiveness at low temperatures. Polymeric plasticizers have less tendency to migrate but are not always satisfactory for highly flexible substantially elastic articles since they are ineffective at low temperatures.

The polymeric plasticizers used in the plastic layer 1 may be rubbery copolymers of a conjugated diolefinic compound such as butadiene-1,3 and a carbonyl-containing mono-olefin, such as methylisopropenylketone; nitrile rubbers or copolymers of butadiene and vinyl cyanide (particularly copolymers of about 60 parts of butadiene-1,3 and about 40 parts of vinyl cyanide); or polyesters, such as polypropylene glycol adipate, polyethylene glycol adipate, polypropylene glycol sebacate, or other viscous condensation products of a polyethylene glycol and a polyethylene glycol and a polybasic acid, which products have a molecular weight of around 1,000 to 40,000.

The monomeric plasticizers used in the plastic layer 1 may be of various types suitable for polyvinyl halide resins or the like but are usually high boiling esters such as members of the group consisting of (a) organic phosphates, such as tricresyl phosphate, triphenyl phosphate, cresyl diphenyl phosphate, tributyl phosphate, trioctyl phosphate, or the like; (b) adipates, such as dioctyl adipate, dihexyl adipate, dibutyl adipate, diphenyl adipate, or the like; and (c) phthalates such as dioctylphthalate, diamyl phthalate, diisooctylphthalate, dibutyl phthalate, dicapryl phthalate, diethyl phthalate, dimethyl phthalate, diethyoxyethyl phthalate, dibutoxyethyl phthalate, dimethoxyethyl phthalate, or the like.

The plasticizers present in the resins of the base layer 1 may consist entirely of monomeric plasticizers or may consist of a mixture of one or more of the above-mentioned polymeric plasticizers and one or more monomeric plasticizers, such as dioctyl azelate, dioctyl phthalate, dioctyl adipate, tricresyl phosphate, or the like. The amount of plasticizers is sufficient to provide the desired amount of flexibility and extensibility and is usually about 5 to 80 parts by weight per 100 parts by weight of the resins. Small amounts of suitable vinyl stabilizers or the like may also be employed as will be apparent to those skilled in the art.

The plastic layer 1 may also include additives, fillers, and other conventional compounding ingredients including heat and light stabilizers, waxes, flame retardants, bodying agents, lubricants and coloring agents. This layer may include a filler, such as carbon black, calcium carbonate, talc or diatomaceous earth; a stabilizer such as lead fumarate, barium stearate or dibasic lead phosphite; and various other compounding ingredients. Excellent laminated articles can be obtained by employing a plastic body or layer 1 consisting of 5 to 80 parts and usually at least 25 parts of monomeric and/or polymeric plasticizers and up to 10 parts of suitable heat and light stabilizers, such as fused lead stearate, basic lead carbonate, barium cadmium laurate or the like per 100 parts of thermoplastic polyvinyl halide resins. The layer 1 may contain fillers such as carbon black, calcium carbonate, etc. and various pigments up to about half the total amount of resins plus plasticizers.

A tie coat or intermediate bonding layer 2 is formed by applying to the layer 1 thermoplastic copolymers of two or more copolymerizable unsaturated organic compounds which copolymers inherently adhere well to the material forming the layer 1. The bonding layer 2 is preferably formed from vinyl-halide copolymers of at least two copolymerizable olefinically unsaturated organic compounds including (A) at least 50% by weight of vinyl halides under the above general Formula I consisting only of carbon, halogen (preferably chlorine), and hydrogen atoms and having only one carbon atom connected to a halogen atom, said vinyl halides preferably being similar to the principal vinyl halides used in forming the layer 1, (B) up to 50% (i.e., 0 to 30% and preferably 5 to 20%) of olefinically unsaturated esters, particularly those under the above general Formula II such as vinyl acetate, vinyl propionate, vinyl butyrate, methyl acrylate, ethyl acrylate, methyl methacrylate, ethyl methacrylate, methyl ethacrylate, ethyl ethacrylate, dimethyl maleate, diethyl maleate, other esters consisting only of carbon, oxygen and hydrogen atoms and having two oxygen atoms and 3 to 8 carbon atoms per molecule, or the like, and (C) up to 30% and preferably 0.5 to 25% by weight of an acidic organic material consisting of unsaturated carboxylic acids (including half esters and acid anhydrides) preferably consisting only of carbon, oxygen and hydrogen atoms and preferably having at least one acid oxycarboxide or carboxyl group (—COOH or anhydride group) connected to a double-bonded carbon atom, such as acrylic acid, methyl acrylic acid, ethyl acrylic acid, or similar monocarboxylic acids, maleic acid, fumaric acid, mesaconic acid, citraconic acid or other dicarboxylic acids or their anhydrides, half esters of such acids (i.e., monomethyl maleate, monoethyl maleate or the like), or the like. At least 80% and usually all of the vinyl halide copolymer forming the bonding layer 2 is derived from vinyl halides, vinyl esters and carboxylic acids or anhydrides of the type mentioned above. Carboxyl groups appear to be very effective when derived from an unsaturated dibasic acid wherein the carboxyl groups are connected to adjacent double-bonded carbon atoms (as in maleic acid, for example), and advantages of the invention are obtained where the bonding layer 2 is formed of a vinyl halide copolymer derived from only 0.2% of such dibasic acids.

Advantages of the invention are also obtained when the copolymer forming the bonding layer 2 is derived from 0.5 to 25% and preferably less than 10% of less common olefinically unsaturated carboxylic acids (or their anhydrides) such as glutaconic acid, hydrosorbic acid, beta pentenoic acid, angelic acid, tiglic acid, vinyl acetic acid, allyl acetic acid, beta vinyl acrylic acid, beta methyl acrylic acid, beta ethyl acrylic acid, beta-beta dimethyl-acrylic acid, and various other alpha-beta- and beta-gamma-unsaturated organic acids, particularly those consisting only of carbon, hydrogen and oxygen atoms and having only one double bond and 3 to 6 carbon atoms.

The acidic vinyl halide copolymers suitable for the tie coat or bonding layer 2 are preferably thermoplastic vinyl resins having long carbon chains, the depending groups other than hydrogen and alkyl groups attached to the carbon atoms of said chains preferably consisting principally of halogen groups (preferably chlorine groups obtained from vinylidene chloride or vinyl chloride) and including 0 to 50% of ester groups and 0.2 to 30% and usually at least 0.5% of acidic oxycarboxide or carboxyl-containing groups such as acid anhydride, carboxyl, or the like. A small percentage (0 to 10% and preferably no more than 5%) of the depending groups may be hydroxyl (hydrolyzed ester) groups.

The material used to form the bonding layer is preferably free of monomeric and polymeric plasticizers. The layer will become plasticized somewhat by plasticizer migration, however, and may be compounded with minor amounts of certain polymeric plasticizers.

The intermediate bonding layer 2 may also be formed from thermoplastic carboxyl-containing copolymers of at least two copolymerizable unsaturated organic compounds including (A) a major portion by weight of esters of acrylic acids having preferably 3 to 5 carbon atoms which esters consist only of carbon, hydrogen and oxygen atoms and have preferably 4 to 8 carbon atoms, such as methyl acrylate, ethyl acrylate, ethyl hexyl acrylate, or other alkyl acrylates, methyl methacrylate, ethyl methacrylate, methyl ethacrylate or other alkyl alkylacrylates, mixtures thereof, or the like, (B) up to 50% (i.e., 0 to 50%) of vinyl chloride or other vinyl halide under the above general Formula I, and (C) up to 30% and preferably 0.5 to 25% of copolymerizable unsaturated carboxylic acids or anhydrides consisting of carbon, oxygen and hydrogen atoms (preferably at least one carboxyl group being connected to a double-bonded carbon atom) of the type described above, especially the acrylic acids and the maleic, citraconic and itaconic acids and anhydrides. At least 80% and preferably all of the copolymers are derived from the above acrylic esters, vinyl halides, and carboxylic acids. The depending groups of such copolymers other than hydrogen and alkyl groups attached to the carbon atoms of the long carbon chains consist principally of acrylic ester groups

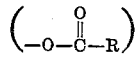

where C is carbon, O is oxygen, and R is an alkyl group with 1 to 8 and preferably 1 to 4 carbon atoms, and include 0 to 50% of halide groups, and at least 0.2% and preferably 0.5 to 25% of carboxyl, anhydride or other acid groups obtained from the carboxylic acids mentioned above. At least 80% and usually all of the depending groups other than hydrogen and alkyl groups are the above mentioned ester, carboxyl, anhydride and/or halide groups. Again the copolymers may contain small percentages (up to 10%) of depending hydroxyl groups.

The copolymers used in the bonding layer are selected so that they will adhere to the layer and may, for example, be the same carboxyl-containing vinyl halide copolymers, a mixture of different vinyl halide copolymers, the same carboxyl-containing acrylic copolymers, or a mixture of different acrylic copolymers. The particular copolymers used in the bonding layer may be dissolved in methyl ethyl ketone or various other suitable solvents and applied to the plasticized vinyl halide sheet 1 by a roller coater, a brush, a gravure cylinder, a doctor knife or other conventional means to form the thin continuous impervious bonding layer 2. Such layer is then dried thoroughly to evaporate all of the solvent before the epoxy adhesive composition is applied.

Excellent results are obtained where the layer 1 consists essentially of 100 parts of polyvinyl chloride, 25 to 80 parts of suitable monomeric and/or polymeric plasticizers of the type mentioned above, up to 50 parts of suitable pigments and fillers, and 1 to 10 parts of suitable light and heat stabilizers, and the bonding layer 2 is applied as a composition consisting essentially of a copolymer of 80 to 88% vinyl chloride, 12 to 18% vinyl acetate, and 0.4 to 5% of unsaturated carboxylic acids, such as acrylic acids, fumaric acids, maleic acids or half esters or anhydrides thereof (particularly maleic acid or its anhydride).

Good bonds to the tie coat 2 by the amine-cured epoxy adhesive are obtained where the layer 1 comprises a rigid unplasticized polyvinyl chloride, but the adhesion to plasticized polyvinyl chloride is not the result of the ability of the tie coat to resist plasticizer migration but to the presence of carboxyl or anhydride groups which react with and/or adhere to the amine-epoxy adhesive layer 3. A conventional barrier layer to prevent plasticizer migration will not provide satisfactory adhesion. The use of carboxyl-containing copolymers is essential since satisfactory adhesion is not obtained merely by mixing carboxyl-containing materials (i.e., benzoic acid) with the resins of the bonding layer 2. The carboxyl groups must be a part of a copolymer which will adhere well to the layer 1.

The present invention relates to epoxy resins and particularly those having hydroxyl groups and terminal 1,2 epoxide groups. The intermediates for the synthesis of epoxy resins are diepoxies, such as butadiene dioxide or diglycidyl ether, and particularly halhohydrins such as 1,2-dichloro-3-hydroxy propane, dichlorohydrin, and epichlorohydrin. These intermediates may be reacted with polyhydric alcohols, such as glycerol, or with mono- or polynuclear polyhydroxy phenols, such as resorcinol, hydroquinone, pyrocatechol, saligenin, phloroglucinol or a bisphenol, such as dihydroxyl diphenyl sulfone, 4,4'-dihydroxyl biphenyl, trihydroxyl diphenyl dimethyl methane, or the like to produce an epoxy resin. The invention is particularly concerned with epoxy resins made by reacting chlorohydrins such as epichlorohydrin, dichlorohydrin or mixtures thereof with glycerol, 4,4'-dihydroxy biphenyl, a bisphenol having the Formula III

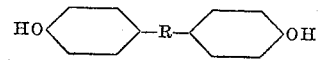

higher homologues thereof such as "bisphenol C," which is 2,2-bis (4-hydroxy-5-methylphenyl) propane, mixtures thereof, or the like. In the above Formula III R is an aliphatic hydrocarbon radical having 1 to 20 carbon atoms and preferably a saturated aliphatic hydrocarbon radical having 1 to 8 carbon atoms. The Formula III covers the less common long-chain bisphenols (see U.S. Patent No. 2,665,266) of the general Formula IV

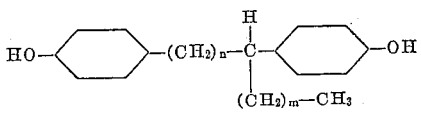

where $m$ and $n$ have values preferably from 1 to 8, as well as the more common 2,2-p-hydroxyphenyl propane (bisphenol A) and p,p'-dihydroxy diphenyl methane (bisphenol F).

We have discovered that epoxy resins of the type described above such as those having a molecular weight of 200 to 1000 and free of functional groups other than epoxide and hydroxyl groups are excellent adhesives for tie-coated polyvinyl chloride sheets when cured with certain primary or secondary amine curing agents such as commercial polyalkylene polyamines, adducts or polyamides.

The present invention is particularly concerned with liquid epoxy resins, that is epoxy resins or epoxy resin blends that are fluid at temperatures of 20° or 30° centigrade. A solid epoxy resin with a melting point of 50° to 80° C. made from epichlorohydrin, and bisphenol A may, for example, be dissolved in a low viscosity epoxy resin made from glycerol and epichlorohydrin to produce a blend which is fluid at about room temperature. The epoxy resins used in the present invention preferably have a melting point not in excess of 50° C. The most practical adhesives are made from liquid epoxy resins which are fluid at room temperature (i.e., 20° to 25° C.) and which do not require substantial amounts of diluents.

Methods of making epoxy resins suitable for use in the method of the present invention are well known in the art and are described in "Epoxy Resins" by Henry Lee and Kris Neville, published in 1957 by McGraw-Hill Book Company, Inc., and also in U.S. Patent No. 2,510,885 and U.S. Patent No. 2,585,115. The most common commercial epoxy resins are formed by reacting glycerol and/or bisphenol A with excess epichlorohydrin in the presence of sodium hydroxide or other caustic. Some commercial resins highly suitable for use in the present invention are "Epon" resins 562, 815, 820, 828, 834, 864 and 1001 made by Shell Chemical Co., "Bakelite" resins ERL-2774, ERL-3794, and ERL-2795 made by Bakelite Co., "Araldite" resins 502, 6005, 6010, 6020, 6030, 6040, and 6060 made by Ciba Co., Inc., and "Epi-Rez" resins 510, 515, and 520 made by Jones-Dabney Co. The "Cardolite" and "Epiphen" resins made by Irvington Varnish and Insulator Co. and the Borden Co., respectively, also can be used.

Excellent results can be obtained using epoxy resins having the Formula V

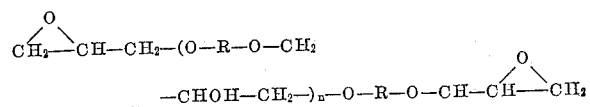

where $n$ is an integer less than 7 and R is the hydrocarbon radical of a dihydric phenol, such as bis-(4-hydroxyphenyl)-2,2-propane, which is known as "bisphenol A." The average value of $n$ in the epoxy resins (mixture) used in this invention is 0 to 4 and preferably not in excess of 3. Good results may be obtained where up to 50 or 60% of the epoxy resins used have a molecular weight of 800 to 1500 and a melting point of 50° to 100° C., but at least a major portion of the epoxy resins used preferably have a molecular weight of 200 to 800 and a melting point less than 50° C. The viscosity can be reduced by adding a small amount (i.e., 10% to 20%) of a diluent such as butyl carbitol, allyl glycidyl ether, butyl glycidyl ether or phenyl-glycidyl ether but better adhesive bonds are obtained when the use of diluents or solvents is avoided.

The preferred epoxy resins for use in the adhesive layer 3 have an epoxide equivalent of 100 to 400, but resins having epoxide equivalents up to 500 or 550 can produce satisfactory results. Best results are obtained with epoxy resins with epoxide equivalents of 150 to 300. The epoxide equivalent is defined as the number of grams of resin containing one gram-equivalent weight of epoxide and is obtained by dividing the average molecular weight by the number of active groups

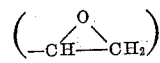

Good results may be obtained in the method of the present invention by employing an epoxy resin in the form of a low molecular weight low viscosity condensation product of glycerol and epichlorohydrin having an epoxide equivalent of 130 to 180 and a melting point below 30° C. and preferably below 15° C. (such as "Epon 562"). Such condensation product may be the sole epoxy resin used but is usually mixed with other of the liquid epoxy resins mentioned above (for example as a diluent).

Excellent results are also obtained when the epoxy resin used is a condensation product of epichlorohydrin and a mixture of 10 to 60% glycerol and 40 and 90% bisphenol A or other bisphenol. Certain "Araldite" resins are of this type.

The epoxy resins employed in the layer 3 are preferably liquids having a viscosity at 25° C. of 100 to 20,000 centipoises. The low viscosity epoxy resins (such as glycerol-based resins) usually make excellent diluents for the semi-solid or high viscosity resins.

The adhesive layer 3 may be formed from a curable epoxy resin composition containing minor amounts (up to 50%) of fillers such as short fibre asbestos, aluminum oxide, powdered iron oxide, alpha cellulose floc, wood flour, aluminum dust or the like. The amounts of such materials may be selected, for example, so that the adhesive layer 3 has a coefficient of expansion close to that of the substrate 4. Since fillers increase greatly the viscosity of a mixture, the use of a diluent may be required, the use of large amounts of solvents such as methylol or methylene chloride preferably being avoided. Some of the preferred diluents are allyl glycidyl ether (preferably no more than 10% of the weight of the epoxy resins used) and the above mentioned condensation products of epichlorohydrin and glycerol (preferably no more than 40% of the weight of the epoxy resins used). Plasticizers such as epoxidized vegetable oils, polyvinyl acetates, or Thiokols (low molecular weight polysulfide polymers), may be used in amounts preferably not in excess of 40% of the weight of the epoxy resins. The amounts of fillers, plasticizers and diluents used may be small and may be selected to provide a paste type adhesive which may readily be spread on the substrate surface and cured at room temperature.

Since the adhesive layer 3 is formed from liquid resins and liquid amine cross-linking agents, it is possible to provide a fluid cement containing large amounts of fillers without requiring substantial amounts of diluents and solvents which would degrade the adhesive. Such a cement is desirable commercially because of its lower cost and is, therefore, usually preferred over more expensive cement compositions which are only slightly better in quality. An inexpensive commercial cement composition may contain, for example, up to 30 parts by weight of methanol as a solvent, up to 20 parts and preferably no more than 15 parts of phenyl glycidyl ether, and up to 150 parts of titanium dioxide, aluminum oxide, calcium carbonate or similar filler per 100 parts of epoxy resins. Alcohol solvents may be used which have no substantial solvent action on polyvinyl chloride and which do not damage the polyvinyl chloride sheet 1 or the tie coat 2.

The "epoxide equivalent" is the equivalent weight of the uncured epoxy resin per terminal 1,2 epoxy group, and the "amine equivalent" is the equivalent weight of the unreacted amine curing agent per active amine group. The "ratio" of the number of active amine groups to the number of terminal 1,2 epoxy groups may be determined by dividing the actual weight of the amine curing agent by the "amine equivalent" to obtain a first quotient, dividing the actual weight of uncured epoxy resins by the "epoxide equivalent" to obtain a second quotient, and dividing the first quotient by the second quotient to obtain said "ratio." This ratio is between 0.1 and 1.0 and is preferably 0.2 to 0.8. Said ratio, for best results, should be about 0.4 to 0.6.

We have discovered that an epoxy resin will adhere to the bonding layer 2 if cured with a suitable primary or secondary amine cross-linking agent. Good results can be obtained with cross-linking agents such as piperidine or any primary and/or secondary aliphatic amine having active amine hydrogen atoms, such as ethylene diamine, dimethylaminopropylamine, 3-diethylaminopropylamine, diethylene triamine, triethylene tetramine, tetraethylene pentamine, adducts thereof, or mixtures thereof. The fast-curing polyalkylene polyamines such as diethylene triamine and triethylene tetramine provide excellent adhesion and rapid cures, but have the disadvantages that they must be used in small amounts and must be measured carefully to obtain the desired physical properties, they have short pot life, they are skin irritants, and they produce hard brittle adhesive layers. For these reasons it is usually preferable to employ curing agents, at least a major portion of which are amine adducts or thermoplastic polyamide curing agents such as "Genamid 250," "Genamid 310," "Versamid 115" or "Versamid 125," made by General Mills, Inc. The "Versamids" are described in detail in volume 7, pages 250 to 260, of the Journal of Applied Chemistry (London), and methods of making such thermoplastic resins are described in the following U.S. Patents: 2,705,223; 2,767,089; 2,811,459; 2,811,495; 2,824,848 and 2,839,549.

The polyfunctional amine cross-linking agents used in the method of the present invention are preferably liquids or liquid blends which are fluid at temperatures less than 30° C. At least a major portion of the amine curing agents used preferably have a melting point not in excess of 50° C., but satisfactory results can be obtained when using substantial amounts of amine cross-linking agents having melting points in the neighborhood of 50° to 100° C. such as metaphenylene diamine, "Versamid 100," or the like. The low viscosity amine curing agents often are excellent diluents for use with higher melting point amine curing agents. It is often desirable to mix small amounts of the more toxic fast-acting polyalkylene polyamines such as diethylene triamine with larger amounts of less toxic slower-acting curing agents such as polyamide resin curing agents or the like, to produce a blend of the desired characteristics.

Excellent results are obtained in the method of this invention using primary aliphatic or alkyl amines (as characterized by diethylene triamine and diethylaminopropylamine), various chemical modifications or adducts of these amines, and amine blends containing these two classes of compounds. The primary aliphatic amines may be modified to obtain longer pot life, lower exotherm, a wider range of combining ratios, and improved handling characteristics. The more important chemical modifications may be classed as resin adducts, cyanoethylation products and alkylene oxide adducts. Examples of other adducts are aliphatic substitutions having the formula

R—NH—CH$_2$—CH$_2$—NH—CH$_2$—CH$_2$—NH$_2$ where R is an aliphatic chain containing 6 to 16 and usually around 12 carbon atoms.

Suitable amine-glycidyl adducts may be synthesized by reacting a primary amine, such as ethylene diamine or diethylene triamine with a diglycidyl ether of bisphenol A or other polyfunctional glycidyl material or with monofunctional glycidyl materials such as butyl glycidyl ether or phenyl glycidyl ether. The reaction is as follows:

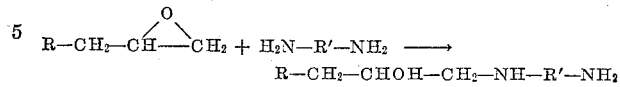

Similar reactions may be obtained with other epoxy resins to produce suitable modified amines or amine adducts for use in the present invention.

Amine adducts suitable for use in the method of this invention may be produced not only by reaction with epoxy resins and ethylene oxide groups, but also by reaction with other organic compounds capable of addition to the amine groups through the active hydrogens. A suitable amine adduct is produced by reaction of amines with acrylonitrile, for example. This reaction is known as cyanoethylation and provides a means of producing adducts such as bis-cyanoethyl diethylenetriamine or the like. These types of adducts are described in U.S. Patent No. 2,753,323.

Excellent low-toxicity amine-adduct curing agents for use in the method of this invention may be obtained by introducing selected functional groups on the nitrogen atoms. The most effective functional group, which still did not decrease reactivity of the parent amine with respect to the glycidyl ether group, appears to be the hydroxy-ethyl group and its alkyl or aryl derivatives. Excellent amine adducts are obtained, for example, by reacting a primary amine, such as ethylene diamine, diethylene triamine or triethylene tetramine, with an alkylene oxide having 2 to 8 and preferably 2 to 4 carbon atoms, such as ethylene oxide or propylene oxide (see, for example, U.S. Patent No. 2,697,118). The reaction with ethylene oxide is as follows:

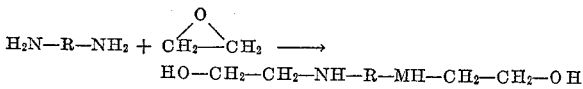

The N-hydroxyalkyl-polyamines produced by this type of reaction are excellent for use in the method of this invention. Typical ethylene oxide and propylene oxide adducts are monohydroxy diethylene triamine, bis-hydroxylethyl diethylene triamine, N-(2-hydroxypropyl) ethylene diamine, N,N'-bis(hydroxyethyl) diethylene triamine, N-(2-phenyl, 2-hydroxyethyl) diethylene triamine, N,N'-bis(hydroxyethyl)-3,3'-imino bis(propylamine), N-(hydroxypropyl) diethylene triamine, N,N-bis(hydroxyethyl)triethylene tetramine, N-(hydroxypropyl)-1,2-diaminopropane, and N-(hydroxypropyl)-m-phenylene diamine. These adducts and methods of making the same are described in more detail in the above-mentioned book, "Epoxy Resins" by Lee and Neville. The adducts obtained by reacting diethylene triamine or triethylene tetramine with ethylene oxide are usually preferred. Both the mono- and bis-hydroxyethyl derivatives obtained by such reaction can be used as curing agents in the method of this invention.

Blends of primary amines and amine adducts are also suitable. Such blends and the various adducts mentioned above are also described in the above-mentioned book. The amine blends may contain minor amounts of higher melting point curing agents such as 4,4'-methylene dianiline, diamino diphenyl sulfone, or dicyandiamide or small amounts of catalytic curing agents, such as trimethylamine or other tetriary amines or salts thereof, stabilizers or catalysts.

Excellent cross-linking agents for use in the method of this invention are primary amines having 2 to 50 and usually 2 to 20 carbon atoms and consisting essentially of carbon, hydrogen, nitrogen and oxygen atoms arranged to provide only alkyl, hydroxy, epoxide, primary amino, secondary amine and/or tertiary amino radicals, said cross-linking agents being free of reactive groups other than amino, epoxy and hydroxy groups. Such cross-linking agents should have a melting point no greater than 50° C. and preferably are liquids at room temperature.

The adhesive composition employed in the method of the present invention often contains plasticizers and flexibilizers. Monofunctional flexibilizers containing a single epoxide group per molecule such as epoxidized vegetable oils and similar compounds represented by the formula

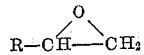

where R is an aliphatic chain with 12 to 50 carbon atoms, can be employed in such adhesive composition. Various polyfunctional flexibilizers may also be employed in addition to long aliphatic-chain epoxy resins. These include fatty diamines, certain polyesters, or thermoplastic polyamide resins such as "Versamids" as described in the above-mentioned book entitled "Epoxy Resins." The fatty diamines and polyamide resins are also curing agents for the epoxy resins. A typical fatty diamine is "Duomeen S" made by Armour and Co. and having the formula

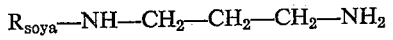

The preferred curing agents for use in the method of the present invention are polyamide resins such as, for example, as condensation products of (1) aryl or alkyl polyamines (especially polyalkylene polyamines) and (2) polymerized vegetable oil acids and/or unsaturated fatty acids (especially dilinoleic acid or various dienoic fatty acids obtained from soybean oil, linseed oil, cottonseed oil or other vegetable oils). Resins of this type are preferred since they have low toxicity, are available in liquid form, cure in a reasonable period of time at room temperature and provide durable flexible adhesive layers.

Polyamide resins derived from dimeric and trimeric fatty acids and aliphatic polyamines are described in the following U.S. Patents: 2,705,223, 2,707,708, 2,811,495 and 2,824,848. As indicated in these patents, the polymeric fat acids employed in preparing polyamide resin curing agents are those resulting from dimerization or trimerization of drying or semi-drying oils, or the free acids or simple aliphatic alcohol esters of such acids (i.e., sources rich in linoleic acid). Suitable drying or semi-drying oils include, linseed, soybean, tung, perilla, cottonseed, corn, sunflower, safflower, and dehydrated castor oil. Suitable fatty acids may also be obtained from tall oil, soapstock or the like.

In the polymerization process for the preparation of the polymeric fat acids, the fatty acids with sufficient double bond functionality combine for the most part, probably by a Diels-Alder mechanism, to provide a mixture of dibasic and higher polymeric acids. The acids with insufficient functionality to react remain as monomers and may be wholly or partially removed, for example, by distillation. The residue after distillation consists of the desired polymeric acids, and this mixture may be used for the preparation of the polyamide resin. In place of this method of polymerization, any other method of polymerization may be employed whether the resultant polymer possesses residual unsaturation or not. The term "polymeric fat acid" as used in the specification and claims is intended to include the polymerized mixture of acids obtained, which mixture usually contains a predominant portion of dimeric acids, a smaller quantity of trimeric and higher polymeric acids and some residual monomers.

Since the only naturally occurring poly-unsaturated acid available in large quantities is linoleic acid, which occurs as complex mixtures, commercial polyamide resins (such as "Versamid" resins made by General Mills, Inc.), are usually made from polymeric fat acids obtained from linoleic-acid-rich mixtures of fatty acids. The linoleic acid dimer may be obtained from 9,11-linoleic acid and 9,12-linoleic acid by a Diels-Alder reaction and then converted to a trimer by a further Diels-Alder reaction with linoleic or linolenic acid as described, for example, in the above-mentioned book entitled "Epoxy Resins."

A polymerized mixture of acids containing a major portion of dimer acids, a small quantity of trimer and higher polymeric fat acids and some residual monomer may be reacted with a polyamine such as ethylene diamine, diethylene triamine, triethylene tetramine, tetramethylene pentamine, 1,4-diamino-butane or the like to form the desired thermoplastic polyamide resin. The polyamine should have at least three atoms intervening between the amino groups principally involved in the amidification reaction. Such atoms may be carbon or hetero atoms. It is assumed that the secondary amine groups of amines, such as diethylene triamine or triethylene tetramine, used to make polyamides with amine values greater than 150 do not enter the reaction.

Versamids such as "Versamid 115" and "Versamid 125" may be prepared by the condensation of polymerized (predominantly dimerized) linoleic acid with polyalkylene polyamines, such as diethylene triamine or triethylene tetramine. It is postulated that this reaction may be generally represented by the following Formula VI:

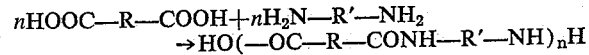

where $n$ is an integer. The radical R' in the above formula includes secondary amine groups when primary amines, such as diethylene triamine, triethylene tetramine or tetraethylene pentamine, are used having a higher functionality than ethylene diamine. Such primary amines, therefore, produce polyamide resins having higher amine values. Triethylene tetramine, for example, can be used to make thermoplastic polyamide resins similar to "Versamid 125" having amine values greater than 300.

Saturated dibasic acids, such as adipic acid or sebacic acid (as well as unsaturated acids or polymeric fatty acids) can be reacted with diethylene triamine, triethylene tetramine or other polyamines in a reaction according to the above Formula VI or in various other reactions to produce various amine curing agents or adducts suitable for use in the method of this invention.

As used in the specification and claims, the "amine value" may be defined as the number of milligrams of potassium hydroxide equivalent to the base content of one gram of the polyamide resin as determined by titration with hydrochloride acid, or, in other words, the number of milligrams of potassium hydroxide equivalent to the free amine groups in one gram of product. When the polyamide resins are prepared from amines such as diethylene triamine, which contain secondary amine groups which presumably do not enter the reaction the amine value may be substantially in excess of 200.

A liquid thermoplastic polyamide resin may be prepared as the condensation product of triethylene tetramine and dimeric linoleic acid. Such condensation product, identified herein as polyamide curing agent No. 2 and having an amine value of 290 to 320 and a Brookfield viscosity of about 80 to 120 poises at 40° C. (measured on a Brookfield viscometer with No. 6 spindle at 4 r.p.m.) is an excellent amine curing agent for use in the method of the present invention. A commercial resin of this type is "Versamid 125."

It is indicated in U.S. Patent No. 2,839,549 how 28.5 pounds of dimer fatty acids can be reacted with 9.4 pounds of triethylene tetramine for about 3 hours at 200° C. to produce a polyamide having an amine value in excess of 200 and an acid number of around 5 or 6 and containing about equal percentages of primary and secondary amines. Such polyamide would be an effective curing agent for epoxy resins.

Typical polyamide resin curing agents are made from diethylene triamine and linoleic-acid-rich polymeric fat acids, such as an acid material containing 5 to 15% monomer, 60 to 80% dimer and 10 to 25% trimer. These may be reacted for 3 hours at around 200° C. to produce the polyamide.

The polyamides for use in the method of the present invention preferably have a melting point not in excess of 50° C. and an amine value of 100 to 400, best results being obtained with low melting point polyamide resins, such as "Versamid 115" or "Versamid 125," which are fluid at room temperature (i.e., below 25° C.) and which effect a cure in a reasonable time at a temperature of 15° to 50° C. "Versamid 115" has an amine value of 210 to 230 and a viscosity at 40° C. of around 600 to 1200 poises. "Versamid 125" has an amine value of 290 to 320 and a viscosity at 25° C. of around 300 to 600 poises. "Versamid 100," which has an amine value of 83 to 93 and a melting point of around 43 to 53° C., can be used in the method of the present invention especially when blended with "Versamid 125" or some other lower viscosity amine curing agent such as diethylene triamine or the like.

When curing the epoxy resins solely by thermoplastic polyamide resins of the type described above or mixtures of such polyamides, 30 to 150 parts of the polyamide resins are usually required per 100 parts of the epoxy resins being cured. When curing "Epon 828," for example, with a polyamide resin having an amine value of around 300, 50 to 100 parts of the polyamide per 100 parts of epoxy resin provide good results. The ratio of active amine groups to terminal epoxy groups should be 0.1 to 1.0 and is preferably 0.2 to 0.8.

When using lower molecular weight curing agents such as diethylene triamine, triethylene tetramine, 3-diethylamino-propylamine or the like, much smaller amounts of curing agent are used. About 5 to 20 parts of fast-acting amine curing agents, such as diethylene triamine or triethylene tetramine, per 100 parts of epoxy resins are usually sufficient to cure the layer 3 satisfactorily. Best results are usually obtained where the ratio of active amine groups to terminal epoxy group in the uncured amine-epoxy mixture employed to form the layer 3 is 0.2 to 0.8.

Whether using the above liquid polyamide curing agents or the above mentioned fast acting liquid curing agents in performing the method of this invention, the amounts of curing agent are preferably selected so that the number of hydrogen atoms attached to nitrogen atoms of the amine curing agents is 0.8 to 1.3 times the number of terminal 1,2 epoxy groups in the epoxy resins.

The amine-H-value, which is the number of hydrogen equivalents attached to nitrogen per 100 grams of amine curing agent, is first determined for the curing agent (or mixture thereof). Thus diethylene triamine with five active amine hydrogen atoms has an amine-H-value of about 4.85, and metophenylenediamine has an amine-H-value of around 3.7.

The epoxide value, which is the number of epoxide equivalents per 100 grams of epoxy resin, is then determined. Thus a condensation product of glycerol and epichlorohydrin with an epoxide equivalent of 150 would have an epoxide value of 0.67.

When performing the method of this invention with any amine curing agent, the number of parts of curing agent used with one part of the epoxy resin to be cured is 0.5 to 1.5 (and preferably 0.8 to 1.3) times the epoxide value divided by the amine-H-value. Thus when curing an epoxy resin having an epoxide equivalent of 200 and an epoxide value of 0.5 with diethylene triamine having an amine-H-value of 4.85, about 8 to 12 parts of the curing agent are preferably employed per 100 parts of the epoxy resin, and when curing the same epoxy resin with the slower acting metaphenylenediamine, about 12 to 16 parts of the curing agent would preferably be employed per 100 parts of epoxy resin.

The amine curing agents used in the present invention preferably are capable of effecting a cure in a reasonable time at a temperature of 15° to 50° C. but it will be understood that the same curing agents often can produce excellent results when higher temperatures (i.e., 70° C. to 150° C.) are employed, particularly when the higher temperatures are maintained for short periods of time or are insufficient to damage the polyvinyl chloride layer 1 or the bonding layer 2. Good results can often be obtained by postcuring at a temperature up to 110° C.

The curing agents used in the method of the present invention are able to cure the epoxy resin to a substantially non-fluid state and preferably to a non-plastic infusible state in 8 to 10 hours at 15° to 50° C. so as to obtain bonds of substantial strength in that period of time. After several days at 15° to 50° C. high bond strengths are obtained which may approach or exceed the strength of the polyvinyl chloride layer 1.

Since the amine curing agents employed in the preferred method of the present invention effect curing at ambient temperatures below 50° C., they are usually mixed into the epoxy resin adhesive composition less than one hour before or a few minutes before such composition is applied to the surface of the substrate 4 and/or the barrier layer 2 to form the adhesive layer 3. In order to obtain good bonds, it is preferable to press the polyvinyl chloride layer 1 against the substrate in such a way as to remove all air trapped between these two bodies and to stick the bodies together. It is usually unnecessary thereafter to hold the bodies together as the adhesive cures since they will remain stuck together unless pulled apart by a substantial force.

In the method of the present invention it is preferable to employ a curable adhesive composition which is fluid at temperatures from 15° to 30° C., which can be conveniently applied to a substrate surface and/or to the surface of the bonding layer 2 to form the adhesive layer 3, and which can be cured in a reasonable time at 15° to 50° C. and preferably at room temperature (i.e., 20° to 25° C.). The desired fluidity can be obtained by employing sufficient amounts of low viscosity or low melting point epoxy resins and amine curing agents. The predominant epoxy resins and the predominant amine curing agents should have melting points less than 50° C. so that the desired fluidity at room temperature can be obtained without using objectionable amounts or objectionable types of solvents and/or diluents. Low viscosity materials are often preferred so as to permit use of substantial amounts of fillers which reduce the cost of the adhesive composition.

In the method of this invention, best results are usually obtained where the curing agents for the epoxy resins consist predominantly of low-toxicity flexibilizing thermoplastic fluid polyamide resins obtained from polymeric linoleic acid and either diethylene triamine, triethylene tetramine, or tetraethylene pentamine and having amine values of 150 to 400 and melting points below 40° C., and the epoxy resins consist predominantly of liquid reaction products of glycerol or a bisphenol, such as bisphenol A, and epichlorohydrin which products have melting points below 40° C., but it will be apparent to those skilled in the art that excellent results can be obtained using various blends of epoxy resins and various blends of amine curing agents which include minor amounts of higher-melting-point materials. Excellent results can be produced using more toxic materials. Curing agents such as ethylene diamine, diethylene triamine, triethylene tetramine or diethylamine-propylamine produce excellent results even when used as the sole curing agent and especially when employed in conjunction with flexibilizers, such as the Versamids. It is usually preferable, however, to employ blends which are not strong skin irritants, such as the amine adducts mentioned above or the polyamide resins. Good results can be obtained, for example, with low viscosity low-toxicity modified amine curing agents having an amine value of 350 to 450, such as "Genamid 250" or "Genamid 310."

Example I

Two polyvinyl chloride compositions are prepared according to the following formulas:

| Composition | A, parts | B, parts |
|---|---|---|
| Polyvinyl chloride | 100 | 100 |
| Dioctyl phthalate | 50 | |
| Polyester Resin [1] | | 55 |
| Barium-cadmium laurate | 1.5 | 1.5 |
| Tin laurate | 0.5 | 0.5 |

[1] Poly(ethylene-propylene) glycol sebacate. This plasticizer may be replaced by polypropylene ether glycol sebacate, polyethylene glycol adipate, or "Paraplex G-53."

Each of compositions A and B is employed to produce sheets of polyvinyl chloride by mixing and fluxing the ingredients together on a hot mill. The resulting mill sheets are press polished to give smooth polished sheets with a thickness of 0.035 to 0.040 inch.

A curable adhesive composition C is prepared by mixing 100 parts of Epon 828, a condensation product of epichlorohydrin and bis-(4-hydroxyphenyl)-2,2 propane having a molecular weight of 350 to 420, with 67 parts of the above-described polyamide curing agent #2 or "Versamid 125."

The composition C is brushed onto two pieces of Masonite hardboard having a thickness of ¼ inch to form continuous adhesive layers with a substantially uniform wet thickness of about .005 inch. The polyvinyl chloride sheet made from composition A is laid on the adhesive layer of one piece of hardboard to form a first laminated panel, and the sheet made from composition B is laid on the adhesive layer of the other piece of hardboard to form a second laminated panel. Each polyvinyl chloride sheet is rolled down with moderate pressure to expel all the air from between the sheet and the adhesive layer of the panel and to insure intimate contact between the sheet and the adhesive layer throughout the length and width of the sheet. The panels are then allowed to stand at room temperature of about 20 to 25° C. for 7 to 10 days until the epoxy resin adhesive layers thereof are cured to a hard tough infusible state.

The peel adhesion strength for each panel is then determined in the customary manner on a conventional Instron tester by pulling one inch sample strips of the polyvinyl sheet away from the rigid panel at an angle of 180° using a crosshead speed of 2 inches per minute. It is found that the adhesion in both panels is very poor, the sample made from polyvinyl chloride composition A and cemented with epoxy resin composition C having an Instron peel adhesion strength of 3.5 pounds per lineal inch and the sample made from polyvinyl chloride composition B and cemented with composition C having an Instron peel adhesion strength of 1.5 pounds per lineal inch.

Example II

A barrier layer composition D is prepared by dissolving 100 parts of a copolymer of 90% vinyl chloride and 10% vinyl acetate in 900 parts of methyl ethyl ketone. This composition D, which is free of monomeric or polymeric plasticizers, is brushed onto one side of the polyvinyl chloride sheets made from compositions A and B to form continuous impervious barrier layers completely covering these sheets and having a substantially uniform dry thickness of about 0.0005 to 0.001 inch. These barrier layers are air dryed for 15 minutes at a room temperature of about 20° C. and then for 15 minutes in a circulating hot air oven maintained at 80 to 85° C.

Two panels are then formed and cured as in Example I, the only difference being that the barrier layers formed from composition D as indicated above are placed in contact with the cement layers formed on the two Masonite hardboards by the composition C as indicated above.

After curing at room temperature for 7 to 10 days and for a sufficient period of time to obtain a hard infusible epoxide adhesive layer on each panel, the peel adhesion strength is tested as in Exmaple I. The results are again poor indicating that satisfactory adhesion could not be obtained merely by preventing the migration of the plasticizer. The one-inch-wide sample made from compositions A, C and D shows an Instron peel adhesion strength of 3.5 pounds per lineal inch, and the one-inch-wide sample made from compositions B, C and D shows an Instron peel adhesion strength of 3.0 pounds per lineal inch. These bond strengths are too low for any commercial applications making it easy to understand why epoxy resin adhesives were heretofore unsatisfactory for use with vinyl halide plastics.

Example III

A composition E, free of monomeric or polymeric plasticizers, is prepared by dissolving 100 parts of a copolymer (terpolymer) of 86% vinyl chloride, 13% vinyl acetate and 0.5 to 1.0% maleic acid in 900 parts of methyl ethyl ketone, said copolymer containing about 0.7 to 0.8 percent carboxyl groups. The composition E is brushed onto one side of the polyvinyl chloride sheet made from compositions B as in Example I to form a continuous bonding layer completely covering the sheet, and the bonding layer is dried for 15 minutes at room temperature and for 15 minutes at 80 to 85° C. as in Example II to a dry thickness of about 0.0005 to 0.001 inch.

The uncured composition C is then applied to a ¼ inch Masonite hardboard piece to form an adhesive layer with a wet thickness of about 0.005 inch as in Example I and a laminated panel is formed as in Example II, the bonding layer formed above from composition E being pressed against the adhesive layer formed from composition C so as to be maintained in contact therewith during curing of the adhesive for 7 to 10 days at a room temperature of about 20° C. Said bonding layer has the same uniform thickness as the barrier layers of Example II.

After the curing of the adhesive is completed and the adhesive is hard and infusible, the bond strength is measured on the Instron tester as in Example I and is found to be very good. The Instron peel adhesion strength of the one-inch-wide sample made from compositions B, C and E is found to be 17 pounds per lineal inch or more than 5 times that obtained with a conventional barrier layer made from composition D. The test does not, however, cause tearing of the polyvinyl chloride sheet, the place of failure being between the epoxy resin layer and the bonding layer.

Example IV

A panel is formed and cured exactly as in Example III except that the 67 parts of polyamide resin used to cure the epoxy resins is replaced with 100 parts of diethylene triamine, the epoxy resin composition C being replaced with a liquid epoxy resin composition F which is prepared by mixing 100 parts of Epon 828 with 10 parts of liquid diethylene triamine. This completed panel consists of a Masonite hardboard substrate, a cured infusible epoxide layer with a thickness of several thousandths of an inch bonded thereto and formed from the composition F, a bonding layer with a thickness of .0005 to .001 inch bonded to the epoxide layer and formed from composition E, and a polyvinyl chloride layer with a thickness of 0.35 to .04 inch bonded to the bonding layer and formed from the composition B.

This panel is tested on the Instron tester as in Example I and the results are extremely good, the bonds being so strong that the sheet of polyvinyl chloride tears without breaking the adhesive joints. The peel adhesion strength is at least 25 pounds per lineal inch so as to suggest a chemical bond.

Example V

A laminated panel is prepared and tested exactly as in Example IV except that the polyvinyl sheet is made from the composition A instead of composition B. The completed panel consists of a Masonite hardboard, an adhesive layer formed by curing the composition F at room temperature, a bonding layer formed from composition E, and a polyvinyl chloride layer formed from composition A as in Example I. A sample from this panel tested as in Example I again shows an Instron peel adhesion strength of at least 25 pounds per lineal inch, the polyvinyl chloride sheet tearing without breaking the bond. This test shows that extremely strong bonds having a strength characteristic of chemical bonds are obtained even when the polyvinyl chloride contains highly migratory monomeric plasticizers.

Example VI

A panel is formed, cured and tested by exactly the same procedure as in Example III except that the composition E is replaced by a composition G consisting of a polyacrylic copolymer of about 95% methyl methacrylate and about 5% maleic acid. The bonds obtained are very strong, indicating that good tie coats can be made from carboxyl-containing acrylic resins.

Example VII

A panel is formed, cured and tested by exactly the same procedure as in Example III except that the bonding layer and the plasticizer are omitted and the flexible plasitcized polyvinyl chloride sheet is replaced with a rigid unplasticized sheet of a polyvinyl chloride homopolymer, the polyvinyl sheet being adhered to the Masonite hardboard solely by the epoxy adhesive made from composition C. The results are poor as in Example II indicating that epoxy resins normally will not stick to polyvinyl chloride resins.

In each of the above examples the various layers are physically applied in generally the same way so that the layers of each laminated panel are of about the same thickness. In each case the amine curing agent is mixed into the curable epoxy resin composition a few minutes before spreading the adhesive on the Masonite hardboard, and the tie cost or bonding layer of the vinyl sheet is pressed against the epoxy layer within a few minutes after applying the adhesive and before the adhesive has a chance to cure substantially. The stickiness of the paste adhesive is relied upon to hold the vinyl sheet in place while the epoxy adhesive cures 6 to 8 hours at room temperature. Thereafter, the adhesive bond has substantial strength and will hold the vinyl sheet firmly in place.

The method of the present invention permits bonding of vinyl plastics to almost all types of surfaces. Where thermo-forming of the vinyl film or layer or other suitable forming method is employed to cause the vinyl body to conform in shape to an irregular substrate surface, such body may be firmly bonded to such surface in spite of the many curves and depressions which may be present in such surface. Such forming of the plastic layer is of course unnecessary when bonding to flat or cylindrical surfaces or other regular surfaces.

The method facilitates bonding of a vinyl halide plastics to itself; to fibrous materials, such as plywood, particle board, hardwood or the like used in tables, case goods or other furniture, walls, kitchen cabinets, doors or shelves; to high or low grade masonry materials, such as poured concrete, cinder block, concrete block or the like, used in the building industry; to aluminum, brass, steel or other metal articles (either before or after forming, riveting and/or welding of the same) used in wall partitions, office furniture, filing cabinets, metal kitchen cabinets, metal furniture, television sets, automotive interiors; to polyester-fiberglass surfaces or the like, used for example in fiberglass boat decks or decorative woodgrain simulations; to interior walls made of plaster or various other materials; or to various other substrates. The method of the present invention enlarges the field of use for polyvinyl halide plastics so that such field is now almost limitless and represents a really important advance in the plastics art.

Our method of adhering polyvinyl sheets to walls or other substrates is far superior to the prior method which employed a pressure sensitive adhesive to hold the sheets in place. Such pressure sensitive adhesives did not produce strong permanent bonds since the adhesive layer was not cured to a hard infusible state and was easily weakened by plasticizer migration. Furthermore, the pressure sensitive adhesive tended to flow under stress so as to separate the vinyl sheet from the substrate. The cured polyepoxide adhesive layers produced by the method of the present invention harden on ageing so as to produce strong permanent bonds which are not subject to cold flow and are not damaged by any plasticizer which may migrate thereto. Such adhesive layers, for some reason, adhere amazingly well to carboxyl-containing bonding layers even though they will not provide a satisfactory bond to ordinary polyvinyl chloride sheets.

The depending groups attached to the main polymeric chain of a copolymer of two or more monomers are considered to be "derived from" said monomers. The expression "derived from" is used in this sense wherever it is employed in the specification and claims hereof. Thus, the depending acetate groups connected to the main carbon chain of a copolymer of vinyl chloride and vinyl acetate are "derived from" vinyl acetate.

The term "parts" wherever used in the specification and claims means parts by weight. All percentages mentioned in the specification and claims are by weight unless the context shows the contrary.

It will be understood that the above description is by way of illustration rather than limitation and that, in accordance with the provisions of the patent statutes, variations and modifications of the specific methods and articles of manufacture herein described may be made without departing from the spirit of the invention.

We claim:

1. A method of bonding a plastic body to a substrate surface comprising the steps of forming a plastic body of thermoplastic vinyl halide polymers, which are derived principally from vinyl halides consisting only of carbon, chlorine and hydrogen atoms and having two double-bonded carbon atoms and no more than two chlorine atoms, only one of the carbon atoms being connected to a chlorine atom; forming an intermediate bonding layer by applying to said plastic body thermoplastic organic copolymers of at least two copolymerizable alpha-beta olefinically unsaturated organic monomers, including (1) compounds consisting of carbon, oxygen and hydrogen atoms and having at least one acidic oxycarboxide radical connected to a double-bonded carbon atom and (2) components selected from the group consisting of (a) said vinyl halides and (b) esters of acrylic acids having 3 to 5 carbon atoms, which esters contain 4 to 8 carbon atoms per molecule and consist only of carbon, hydrogen and oxygen atoms, said copolymers being reaction products of one of said components and one of said compounds having an oxycarboxide radical, 0.2 to 30 percent by weight of said copolymers being composed of said last-named compounds, a major portion by weight of said copolymers being composed of said one of said components, and less than 50 percent by weight of said copolymers being composed of the other of said components; applying to a firm substrate surface a layer comprising a liquid epoxy resin composition containing an epoxy resinous material having terminal epoxy groups and a melting point less than 60° C. and being derived by the reaction of a polyhydric alcohol selected from the group consisting of a bisphenol, glycerol and mixtures thereof and a halohydrin selected from the group consisting of epichlorohydrin, glycerol dichlorohydrin, and mixtures thereof; and curing the epoxy layer at a temperature of 15° to 50° C. in the presence of a polyfunctional amine curing agent having amine groups in which at least one hydrogen atom is connected to a nitrogen atom and having a melting point not in excess of 50° C., said bonding layer being placed in contact with and adhered to the epoxy layer and having a composition materially different from that of said plastic body so as to improve substantially the bond between said body and the epoxy layer.

2. A method as defined in claim 1 in which said vinyl halide polymers forming said plastic body comprise a major portion of a polymer of at least 80 percent by weight of vinyl chloride and said bonding layer is formed principally from copolymers of at least 75 percent by weight of esters of acrylic acids having 3 to 5 carbon atoms.

3. A method as defined in claim 1 in which 100 parts of the liquid epoxy resinous material are mixed with up to 200 parts of fillers to increase the viscosity and such increase in viscosity is offset by adding up to 20 percent by weight of a compatible alcohol solvent, the resulting fluid mixture being applied to the substrate surface, the polymers forming said plastic body being selected from the group consisting of homopolymers of vinyl chloride and copolymers of vinyl chloride and vinyl acetate.

4. A method as defined in claim 1 wherein said curing agent is a resinous condensation product of dimeric linoleic acid and triethylene tetramine having a melting point not in excess of 50° C. and an amine value of 200 to 400.

5. A method of bonding a polyvinyl halide body to substrate surfaces comprising the steps of forming a plastic body of thermoplastic vinyl halide polymers, at least 50 percent by weight of which are derived from vinyl halides consisting only of carbon, halogen and hydrogen atoms and having no more than two halogen atoms, only one of the carbon atoms of each molecule being connected to a halogen atom; forming an intermediate bonding layer by applying to said plastic body vinyl-halide copolymers of a mixture of at least two copolymerizable olefinically unsaturated monomers including (a) a major portion by weight of said mixture of said vinyl halides, (b) up to 50 percent by weight of said mixture of olefinically unsaturated esters consisting only of carbon, oxygen and hydrogen atoms and having 2 oxygen atoms and 3 to 6 carbon atoms, and (c) 0.5 to 30 percent by weight of said mixture of an organic material consisting of olefinically unsaturated organic compounds each consisting only of carbon, oxygen and hydrogen atoms and having at least one acidic oxycarboxide group connected to a double-bonded carbon atom, at least 80 percent by weight of each of said last-named copolymers being formed from at least two members of the group consisting of said vinyl halides, said vinyl esters and said olefinically unsaturated organic compounds; applying to a firm substrate surface a layer comprising an epoxy resin composition which is fluid at temperatures below 30° C., said epoxy resin composition containing an epoxy resinous material having terminal epoxy groups and being derived by the reaction of (1) a halohydrin selected from the group consisting of epichlorohydrin, glycerol dichlorohydrin and mixtures thereof and (2) a bisphenol having the formula

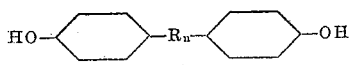

where R is a saturated aliphatic hydrocarbon radical containing 1 to 20 carbon atoms; and curing the epoxy layer at a temperature of 15° to 50° C. in the presence of primary amine cross-linking agents, said cross-linking agents having active amine hydrogen atoms and being present in an amount such that the ratio of equivalents of active amine groups in said cross-linking agents to terminal 1,2 epoxy groups in said epoxy resin is about 0.2 to 0.8; said bonding layer being placed in contact with and adhered to the epoxy layer and having a composition materially different from that of said plastic body so as to improve substantially the bond between said body and the epoxy layer.

6. An article of manufacture comprising a substrate, a deformable plastic body, an intermediate bonding layer firmly bonded to said body, and an infusible insoluble layer of a thermosetting polyepoxide resin composition firmly bonded to said bonding layer and to said substrate rigidly to adhere the plastic body to the substrate, said plastic body consisting principally of vinyl halide polymers and being free of carboxyl and acid anhydride groups attached to the polymeric carbon chains of the polymers forming said body, said vinyl halide polymers being derived principally from vinyl halides consisting only of carbon, chlorine and hydrogen atoms and having no more than two chlorine atoms, only one of the carbon atoms of each vinyl halide molecule being connected to a chlorine atom, said intermediate bonding layer consisting principally of thermoplastic vinyl resins having long carbon chains and depending groups connected to the carbon atoms of said long chains, said last-named resins being copolymers of at least two copolymerizable alpha-beta olefinically unsaturated organic monomers, including (1) compounds selected from the group consisting of olefinically unsaturated carboxylic acids and anhydrides and having at least one acidic oxycarboxide radical and (2) components selected from the group consisting of (a) said vinyl halides and (b) esters of acrylic acids having 3 to 5 carbon atoms, which esters consist only of carbon, hydrogen and oxygen atoms, about 0.5 to 25 percent of the total number of said depending groups other than hydrogen and alkyl groups being oxycarboxide groups selected from the group consisting of carboxyl and acid anhydride groups and derived from said compounds, most of the total number of depending groups of said copolymers other than hydrogen and alkyl groups being derived principally from one of said components, and less than 50 percent of the total number of said depending groups other than hydrogen and alkyl groups being derived from the other of said components, at least 80 percent of the total number of said depending groups other than hydrogen and alkyl groups being at least two members of the group consisting of carboxyl, ester, acid anhydride and halide groups, said polyepoxide resin composition comprising a reaction product of (1) an epoxy resinous material having terminal epoxy groups and a melting point less than 60° C. and being derived by the reaction of a polyhydric alcohol selected from the group consisting of a bisphenol, glycerol and mixtures thereof and a halohydrin selected from the group consisting of epichlorohydrin, glycerol dichlorohydrin, and mixtures thereof; and (2) polyfunctional amine cross-linking agents having active amine groups in which at least one hydrogen atom is connected to a nitrogen atom and having a melting point not in excess of 50° C., the number of active hydrogen atoms attached to the nitrogen atoms of the amine cross-linking agents being about 0.8 to 1.3 times the number of terminal epoxy groups in the epoxy resins being cured.

7. An article as defined in claim 6 in which said cross-linking agents comprise aliphatic amine adducts obtained by reacting an alkylene oxide having 2 to 4 carbon atoms with an aliphatic amine having active amine groups in which a hydrogen atom is connected to a nitrogen atom, said adduct having an amine value of 100 to 600.

8. An article defined in claim 6 in which said cross-linking agents comprise liquid resinous reaction products of fatty acids and aliphatic polyamines having at least three atoms intervening between the amino groups principally involved in the amidification reaction, said last-named product having an amine value of 100 to 400, the polymers forming said plastic body being selected from the group consisting of homopolymers of vinyl chloride and copolymers of vinyl chloride and vinyl acetate.

9. An article as defined in claim 8 wherein said last-named reaction products are reaction products of polymeric linoleic acids and polyalkylene polyamines having an amine value of 200 to 400 and a melting point less than 40° C.

10. An article as defined in claim 6 wherein said epoxy resinous material comprises a liquid mixture of (a) resinous epoxy reaction products of glycerol and epichlorohydrin having a melting point below 20° C. and an epoxide equivalent of 100 to 300 and (b) resinous epoxy reaction products of a bisphenol and epichlorohydrin having a melting point below 100° C. and an epoxide equivalent of 200 to 600.

11. An article as defined in claim 6 wherein said cross-linking agents are resinous condensation products of linoleic acid and diethylene triamine having a melting point not in excess of 50° C. and an amine value of 100 to 400.

12. An article as defined in claim 6 wherein said one of said components is methyl methacrylate and at least 75 percent of said depending groups other than hydrogen and alkyl groups are derived from said methyl methacrylate.

13. In combination, a rigid substrate, a deformable plastic body, an intermediate bonding layer firmly bonded to said body, and an infusible insoluble layer of a thermosetting polyepoxide resin composition firmly bonded to said bonding layer and to said substrate to adhere the plastic body to the substrate, said plastic body consisting principally of polymers of vinyl chloride and being free of carboxyl and acid anhydride groups attached to the polymeric carbon chains of the polymers forming said body, said intermediate bonding layer consisting principally of thermoplastic vinyl resins having long carbon chains and depending groups connected to the carbon atoms of said long chains, most of the total number of the depending groups of said resins other than hydrogen and alkyl groups consisting of chlorine groups, and about 0.5 to 30 percent of said total number of depending groups other than hydrogen and alkyl groups being carboxyl groups, the composition of said resins being such that at least about 80 percent of said total number of depending groups other than hydrogen and alkyl groups are at least two members of the group consisting of halogen, carboxyl, acid anhydride and ester groups, said polyepoxide resin composition prior to curing being fluid at temperatures not in excess of 30° C. and being curable at a temperature of 15° to 50° C., the major portion thereof having a melting point less than 50° C., said last-named composition comprising a reaction product of (1) an epoxy resinous material having terminal epoxy groups and being derived by the reaction of a polyhydric alcohol selected from the group consisting of a bisphenol, glycerol and mixtures thereof and a halohydrin selected from the group consisting of epichlorohydrin, glycerol dichlorohydrin and mixtures thereof and (2) a polyfunctional amine curing agent having active amine groups in which at least one hydrogen atom is connected to a nitrogen atom, the number of active hydrogen atoms attached to the nitrogen atoms of the amine curing agents being about 0.8 to 1.3 times the number of terminal epoxy groups in the epoxy resins being cured.

14. In combination, a deformable plastic body, an intermediate bonding layer firmly bonded to said body, a firm substrate, and an infusible insoluble layer of a thermosetting polyepoxide resin composition firmly bonded to said bonding layer and to said substrate to adhere the plastic body to the substrate, said bonding layer having a composition materially different from that of said plastic body so as to improve substantially the bond between said body and the polyepoxide layer, said plastic body consisting principally of vinyl halide polymers, said vinyl halide polymers being derived principally from vinyl halides consisting only of carbon, halogen and hydrogen atoms and having no more than two halogen atoms, only one of the carbon atoms of each molecule being connected to a halogen atom, said intermediate bonding layer consisting principally of thermoplastic vinyl halide copolymers of a mixture of at least two copolymerizable olefinically unsaturated monomers including (a) a major portion by weight of said mixture of said vinyl halides, (b) less than 50 percent by weight of said mixture of olefinically unsaturated esters consisting only of carbon, oxygen and hydrogen atoms and having 2 oxygen atoms and 3 to 6 carbon atoms, and (c) 0.5 to 30 percent by weight of said mixture of an acidic organic material consisting of olefinically unsaturated organic compounds, each consisting only of carbon, oxygen and hydrogen atoms and having at least one acidic oxycarboxide group connected to a double-bonded carbon atom, at least about 80 percent by weight of each of said last-named copolymers being formed from at least two members of the group consisting of said vinyl halides, said vinyl esters and said last-named olefinically unsaturated organic compounds, said polyepoxide resin composition prior to curing comprising a reaction product of (1) an epoxy resinous material having terminal epoxy groups and being derived by the reaction of a polyhydric alcohol selected from the group consisting of a bisphenol, glycerol and mixtures thereof and a halohydrin selected from the group consisting of epichlorohydrin, glycerol dichlorohydrin and mixtures thereof and (2) polyfunctional amine curing agents having active groups in which at least one hydrogen atom is connected to a nitrogen atom, a major portion of said curing agents having a melting point not in excess of 50° C.

15. In combination, a deformable plastic body, an intermediate bonding layer firmly bonded to said body, a firm substrate, and an infusible insoluble layer of a thermosetting polyepoxide resin composition firmly bonded to said bonding layer and to said substrate to adhere the plastic body to the substrate, said bonding layer having a composition materially different from that of said plastic body so as to improve substantially the bond between said body and the polyepoxide layer, said plastic body consisting principally of vinyl halide polymers, said vinyl halide polymers being derived principally from vinyl halides consisting only of carbon, chlorine and hydrogen atoms and having no more than two chlorine atoms, only one of the carbon atoms of each molecule being connected to a chlorine atom, said intermediate bonding layer consisting principally of thermoplastic vinyl resins having long carbon chains and depending groups attached to the carbon atoms of said long chains, more than half of the total number of the depending groups of said vinyl resins other than hydrogen and alkyl groups consisting of acrylate ester groups, each containing 3 to 5 carbon atoms and 2 oxygen atoms, less than 50 percent of the total number of said depending groups other than hydrogen and alkyl groups being chlorine groups, and 0.5 to 30 percent of the total number of said depending groups other than hydrogen and alkyl groups being oxycarbonyl groups selected from the group consisting of carboxyl and acid anhydride groups, the composition of said vinyl resins being such that at least 80 percent of the total number of said depending groups other than hydrogen and alkyl groups are at least two members of the group consisting of ester, carboxyl, acid anhydride and halide groups, said polyepoxide resin composition prior to curing comprising a reaction product of (1) an epoxy resinous material having terminal epoxy groups and being derived by the reaction of a polyhydric alcohol selected from the group consisting of a bisphenol, glycerol and mixtures thereof and a halohydrin selected from the group consisting of epichlorohydrin, glycerol dichlorohydrin and mixtures thereof and (2) polyfunctional amine curing agents having active groups in which at least one hydrogen atom is connected to a nitrogen atom, a major portion of said curing agents having a melting point not in excess of 50° C.

References Cited in the file of this patent

UNITED STATES PATENTS

| | | |
|---|---|---|
| 2,553,718 | Newey et al. | May 22, 1951 |
| 2,710,821 | Fischer | June 14, 1955 |
| 2,728,703 | Kiernan et al. | Dec. 27, 1955 |
| 2,786,794 | Gams et al. | Mar. 26, 1957 |